(12) United States Patent
Sun

(10) Patent No.: US 11,281,675 B2
(45) Date of Patent: *Mar. 22, 2022

(54) METHOD FOR DETERMINING USER BEHAVIOR PREFERENCE, AND METHOD AND DEVICE FOR PRESENTING RECOMMENDATION INFORMATION

(71) Applicant: Advanced New Technologies Co., Ltd., Grand Cayman (KY)

(72) Inventor: Renen Sun, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/720,416

(22) Filed: Dec. 19, 2019

(65) Prior Publication Data

US 2020/0151174 A1 May 14, 2020

Related U.S. Application Data

(63) Continuation of application No. 16/186,209, filed on Nov. 9, 2018, now Pat. No. 11,086,882, which is a
(Continued)

(30) Foreign Application Priority Data

May 12, 2016 (CN) .......................... 201610313099.X

(51) Int. Cl.
*G06F 16/2457* (2019.01)
*G06F 16/35* (2019.01)
(Continued)

(52) U.S. Cl.
CPC ...... *G06F 16/2457* (2019.01); *G06F 16/2379* (2019.01); *G06F 16/248* (2019.01); *G06F 16/35* (2019.01); *G06F 16/9535* (2019.01)

(58) Field of Classification Search
CPC .. G06F 16/2457; G06F 16/2379; G06F 16/35; G06F 16/9535; G06F 16/248
(Continued)

(56) References Cited

U.S. PATENT DOCUMENTS 8,904,440 B2 12/2014 Kuo
8,918,411 B1 * 12/2014 Latif ...................... H04L 65/403
707/758
(Continued)

FOREIGN PATENT DOCUMENTS

CN 101901450 12/2010
CN 102130933 7/2011
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Hosain T Alam
*Assistant Examiner* — Nicholas E Allen
(74) *Attorney, Agent, or Firm* — Fish & Richardson P.C.

(57) ABSTRACT

Recommendation information is associated with an information classification label by a server of an online interaction platform, and a correspondence between the recommendation information and the information classification label is stored in a feature label database. The recommendation information associated with the information classification label is delivered to a user. Upon triggering of the recommendation information by a user, the information classification label associated with the recommendation information and an unique identifier associated with the user are obtained. By using the unique identifier, a user feature database is queried to determine whether a correspondence
(Continued)

between the information classification label and the unique identifier has been established. If it is determining that the correspondence is not established, the correspondence between the information classification label and the unique identifier is established in the user feature database.

16 Claims, 8 Drawing Sheets

Related U.S. Application Data continuation of application No. PCT/CN2017/080002, filed on Apr. 11, 2017.

(51) Int. Cl.
| | | |
|---|---|---|
| G06F 16/9535 | (2019.01) | |
| G06F 16/23 | (2019.01) | |
| G06F 16/248 | (2019.01) | |

(58) Field of Classification Search
USPC .......................................................... 707/722
See application file for complete search history.

(56) References Cited

U.S. PATENT DOCUMENTS

| | | | | |
|---|---|---|---|---|
| 2008/0109285 | A1* | 5/2008 | Reuther | G06Q 10/063 705/7.11 |
| 2009/0157513 | A1* | 6/2009 | Bonev | G06Q 10/109 705/14.69 |
| 2010/0235313 | A1 | 9/2010 | Rea | |
| 2013/0080435 | A1* | 3/2013 | Gieseke | G06Q 30/06 707/737 |
| 2013/0132366 | A1 | 5/2013 | Pieper | |
| 2013/0166564 | A1* | 6/2013 | Su | G06Q 10/08 707/740 |
| 2013/0198030 | A1* | 8/2013 | Linden | G06Q 30/0256 705/26.7 |
| 2014/0046777 | A1* | 2/2014 | Markey | G06Q 30/0269 705/14.66 |
| 2014/0136554 | A1* | 5/2014 | Moradi | G06F 16/435 707/754 |
| 2014/0156646 | A1* | 6/2014 | Brust | G06F 3/0481 707/722 |
| 2014/0181013 | A1* | 6/2014 | Micucci | G06F 16/90 707/610 |
| 2014/0188889 | A1* | 7/2014 | Martens | H04L 67/22 707/740 |
| 2014/0280005 | A1* | 9/2014 | Powers | G06F 16/951 707/706 |
| 2014/0280226 | A1* | 9/2014 | Wilson | G06N 3/063 707/748 |
| 2014/0280549 | A1* | 9/2014 | Rajan | H04L 67/22 709/204 |
| 2014/0330794 | A1* | 11/2014 | Dellenbach | H04L 67/2833 707/692 |
| 2014/0337348 | A1* | 11/2014 | Wu | H04N 1/6013 707/740 |
| 2014/0379617 | A1* | 12/2014 | Yang | G06Q 30/0631 706/12 |
| 2015/0019559 | A1* | 1/2015 | Maquaire | G06F 16/907 707/740 |
| 2015/0051979 | A1* | 2/2015 | Knab | G06F 16/9535 705/14.66 |
| 2015/0118667 | A1* | 4/2015 | Andrew | G06Q 10/103 434/236 |
| 2015/0200815 | A1* | 7/2015 | Verkasalo | G06Q 10/06 707/740 |
| 2015/0213020 | A1* | 7/2015 | Marvit | G06F 16/9535 707/748 |
| 2015/0220619 | A1* | 8/2015 | Gray | G06F 9/451 707/738 |
| 2015/0304367 | A1* | 10/2015 | Chan | H04L 67/306 709/204 |
| 2016/0004699 | A1* | 1/2016 | Liu | H04N 21/251 707/734 |
| 2016/0007083 | A1* | 1/2016 | Gurha | H04N 21/44222 725/13 |
| 2016/0019298 | A1* | 1/2016 | Brodie | G06F 16/9535 707/734 |
| 2016/0026918 | A1* | 1/2016 | Barbieri | H04L 67/22 706/11 |
| 2016/0026920 | A1* | 1/2016 | Sullivan | G06F 16/438 706/11 |
| 2016/0034468 | A1* | 2/2016 | Hart | G06F 16/24578 707/751 |
| 2016/0034853 | A1* | 2/2016 | Wang | G06F 16/35 705/321 |
| 2016/0063111 | A1* | 3/2016 | Link | G06F 40/253 707/722 |
| 2016/0080485 | A1* | 3/2016 | Hamedi | G06F 16/24578 709/204 |
| 2016/0112394 | A1 | 4/2016 | Sahu | |
| 2019/0079977 | A1 | 3/2019 | Sun | |

FOREIGN PATENT DOCUMENTS

| | | |
|---|---|---|
| CN | 102479366 | 5/2012 |
| CN | 102567511 | 7/2012 |
| CN | 102799662 | 11/2012 |
| CN | 103533530 | 1/2014 |
| CN | 103544188 | 1/2014 |
| CN | 104077714 | 10/2014 |
| CN | 104102648 | 10/2014 |
| CN | 104182516 | 12/2014 |
| CN | 104216881 | 12/2014 |
| CN | 104615779 | 5/2015 |
| EP | 2426633 | 3/2012 |
| JP | 2004094383 | 3/2004 |
| JP | 2007011901 | 1/2007 |
| JP | 2008176491 | 7/2008 |
| JP | 2012173781 | 9/2012 |
| KR | 20090089004 | 8/2009 |
| KR | 20150121370 | 10/2015 |
| TW | 200820019 | 5/2008 |
| WO | WO 2015003480 | 1/2015 |
| WO | WO 2016045498 | 3/2016 |

OTHER PUBLICATIONS

European Extended Search Report in European Patent Application No. 17795367.6, dated Apr. 24, 2019, 10 pages.

International Search Report by the International Searching Authority issued in International Application No. PCT/CN2017/080002 dated Jul. 10, 2017; 9 pages.

Li et al., "Efficient Behavior Targeting Using SVM Ensemble Indexing," 2012 IEEE 12th International Conference on Data Mining, 2012, 409-418.

Liu et al., "Location Type Classification Using Tweet Content," 2012 11th International Conference on Machine Learning and Applications, 2012, 232-237.

Nakamoto, "Bitcoin: A Peer-to-Peer Electronic Cash System," www.bitcoin.org, 2005, 9 pages.

PCT International Preliminary Report on Patentability in International Application No. PCT/CN2017/080002, dated Nov. 13, 2018, 10 pages (with English translation).

* cited by examiner

METHOD FOR DETERMINING USER BEHAVIOR PREFERENCE, AND METHOD AND DEVICE FOR PRESENTING RECOMMENDATION INFORMATION

CROSS-REFERENCE TO RELATED APPLICATIONS

This application is a continuation of U.S. patent application Ser. No. 16/186,209, filed on Nov. 9, 2018, which is a continuation of PCT Application No. PCT/CN2017/080002, filed on Apr. 11, 2017, which claims priority to Chinese Patent Application No. 201610313099.X, filed on May 12, 2016, and each application is hereby incorporated by reference in its entirety.

TECHNICAL FIELD

The present application relates to the field of computer recommendation technologies, and in particular, to a method for determining a user behavior preference, and a method and a device for presenting recommendation information.

BACKGROUND

With the continuous development of Internet technologies, delivering recommendation information to users through the online interaction platform attracts more and more attention. The recommendation information delivered through the online interaction platform usually can include advertisements, weather information, traffic conditions, etc.

When the recommendation information is delivered to the user through the online interaction platform, in order to increase the effectiveness of the delivered recommendation information, it is generally needed to deliver different pieces of recommendation information to users with different behavior preferences, based on the user's behavior preferences. For example, user A often pays attention to the weather conditions of area A, and user B often pays attention to the weather conditions of area B. When weather information is delivered to user A and user B, in order to increase the effectiveness of the weather information delivered, weather information of area A can be delivered to user A, and weather information of area B can be delivered to user B. Currently, how to determine user behavior preferences is a technical problem for companies or individuals that deliver recommendation information.

In the existing technology, data reflecting user behavior preferences is usually collected through questionnaires, and the collected data is analyzed to determine the user's behavior preferences. In this way, in the data collection process, it is necessary to conduct a questionnaire survey on the user, and collect data through the results of the questionnaire survey.

However, because the data is collected through questionnaires and the user behavior preference is determined based on the data, generally the accuracy of the determined user behavior preference depends on the user's answer to the question in the questionnaire. When the user's answer is inaccurate, the accuracy of the determined user behavior preference is relatively low.

SUMMARY

Implementations of the present application provide a method for determining user behavior preference, and a method and a device for presenting recommendation information to alleviate the problem in the existing technology that the accuracy of the user behavior data obtained through questionnaires is low.

An implementation of the present application provides a method for determining a user behavior preference. The method includes associating recommendation information and an information classification label, where the information classification label is used to reflect a classification category of the recommendation information; delivering the recommendation information associated with the information classification label to a user; obtaining the information classification label associated with the recommendation information when learning that the user triggers the recommendation information; and determining a behavior preference of the user based on the obtained information classification label.

Preferably, the user has logged in to an online interaction platform, and the online interaction platform is used to deliver recommendation information to the user: during obtaining the information classification label associated with the recommendation information, the method further includes obtaining a login account of the user, and establishing a correspondence between the login account and the information classification label. Moreover, determining a behavior preference of the user based on the obtained information classification label specifically includes determining the behavior preference of the user based on the information classification label corresponding to the login account.

Preferably, the establishing a correspondence between the login account and the information classification label specifically includes querying a user feature database by using the login account, and determining, based on the query result, whether a correspondence between the login account and the information classification label has been established, where the user feature database includes fields for storing user accounts and fields for storing information classification labels. If not, establishing the correspondence between the login account and the information classification label in the user feature database.

Preferably, when the login account has been associated with a plurality of different information classification labels, the method further includes obtaining, by using the login account, registration information submitted by the user when the user registers the login account, and sorting the information classification labels based on the registration information.

Preferably, the user triggers the recommendation information on a computing device. During obtaining the information classification label associated with the recommendation information, the method further includes obtaining a device identifier of the computing device, and establishing a correspondence between the device identifier and the information classification label. Moreover, determining a behavior preference of the user based on the obtained information classification label specifically includes determining the behavior preference of the user based on the information classification label corresponding to the device identifier.

Preferably, associating recommendation information and an information classification label specifically includes inserting, in data of the recommendation information, association data that can be associated with the information classification label, so that the information classification label associated with the recommendation information can be determined by using the inserted association data after the recommendation information is triggered.

An implementation of the present application provides a method for presenting recommendation information. The method includes receiving a service request, sent by a user, for obtaining recommendation information; obtaining a behavior preference of the user based on the service request, where the user behavior preference is a user behavior preference determined by using the method for determining a user behavior preference, according to the implementation of the present application; determining at least one information classification label based on the user behavior preference, and obtaining at least one piece of recommendation information associated with the information classification label based on the information classification label, where there is an association relationship between the information classification label and the recommendation information; and presenting the obtained recommendation information to the user.

Preferably, the method is used for presenting an advertisement.

An implementation of the present application provides a device for determining a user behavior preference. The device includes an association unit, a delivery unit, an information classification label acquisition unit, and a user behavior preference determining unit. The association unit is configured to associate recommendation information and an information classification label, where the information classification label is used to reflect a classification category of the recommendation information; the delivery unit is configured to deliver the recommendation information associated with the information classification label to a user; the information classification label acquisition unit is configured to obtain the information classification label associated with the recommendation information when learning that the user triggers the recommendation information; and the user behavior preference determining unit is configured to determine a behavior preference of the user based on the obtained information classification label.

An implementation of the present application provides a device for presenting recommendation information. The device includes a receiving unit, a user behavior preference acquisition unit, a recommendation information acquisition unit, and a presenting unit. The receiving unit is configured to receive a service request, sent by a user, for obtaining recommendation information; the user behavior preference acquisition unit is configured to obtain a behavior preference of the user based on the service request, where the user behavior preference is the user behavior preference determined by the device for determining a user behavior preference, according to the implementation of the present application; the recommendation information acquisition unit is configured to determine at least one information classification label based on the user behavior preference, and obtain at least one piece of recommendation information associated with the information classification label based on the information classification label, where there is an association relationship between the information classification label and the recommendation information; and the presenting unit is configured to present the obtained recommendation information to the user.

The previous at least one technical solution adopted by the implementations of the present application can achieve the following beneficial effects:

Since the recommendation information and the information classification label are associated, the information classification label of the triggered recommendation information is obtained after the user triggers the recommendation information, and the behavior preference of the user is determined based on the information classification label. Previously described method for determining a user behavior preference alleviates the problem that in the existing technology, the accuracy of the determined user behavior preference is low when the data is collected through questionnaires and the user behavior preference is determined based on the collected data. In addition, in the implementations of the present application, data is collected through triggering of the recommendation information by the user, As such, the problem that the user experience is poor when the data is collected through questionnaires is alleviated.

BRIEF DESCRIPTION OF DRAWINGS

Accompanying drawings are used for providing a further understanding of the present application, constitute a part of the specification, and are used to explain the present application together with implementations of the present application, but do not constitute a limitation on the present application. In the accompanying drawings.

DESCRIPTION OF IMPLEMENTATIONS

Figure 1:
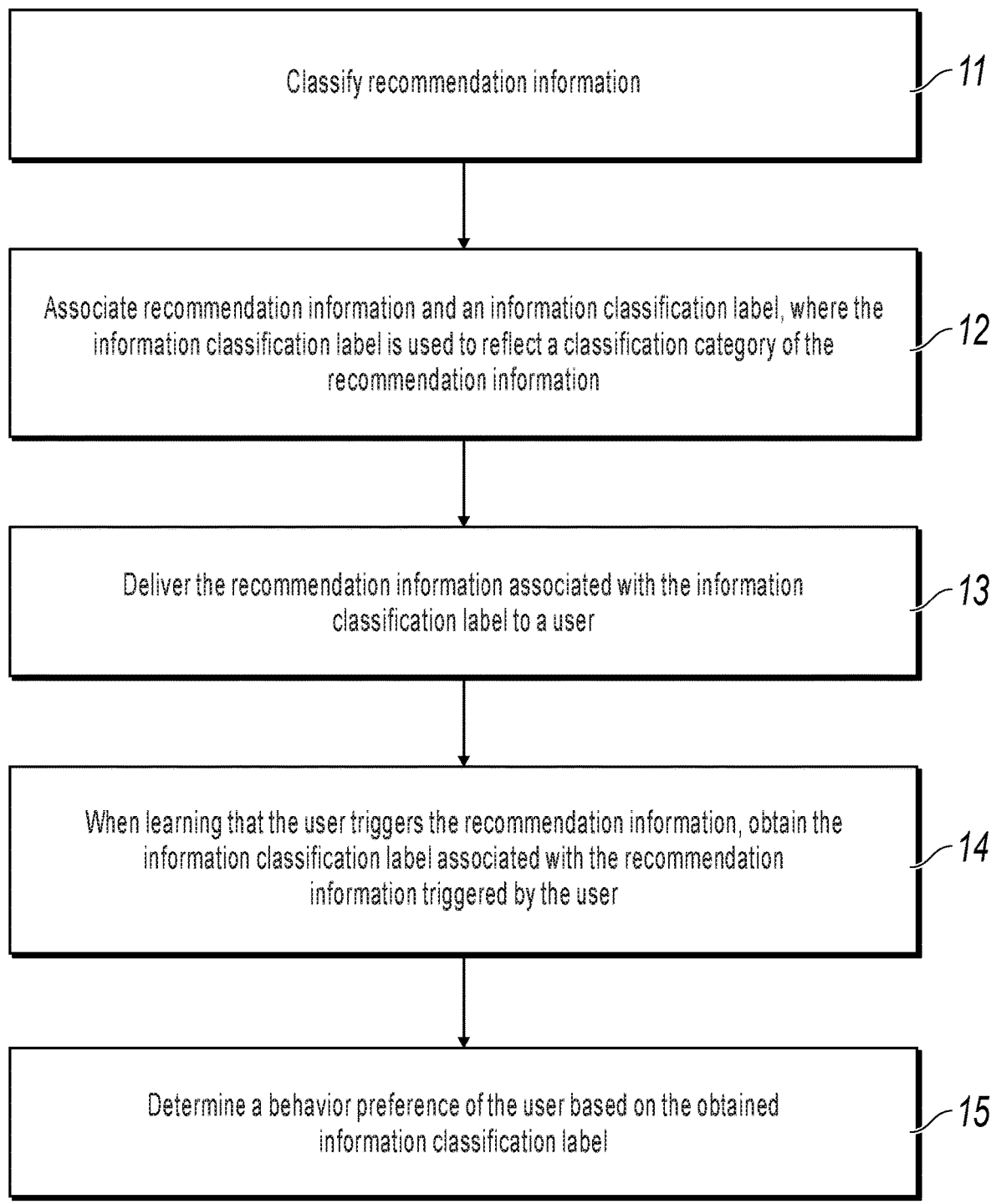
FIG. 1 is a schematic flowchart illustrating a method for determining a user behavior preference, according to Implementation 1 of the present application.

To make the objectives, technical solutions, and advantages of the present application clearer, the following clearly and completely describes the technical solutions of the present application with reference to specific implementations of the present application and corresponding accompanying drawings. Apparently, the described implementations are a part rather than all of the implementations of the present application. All other implementations obtained by a person of ordinary skill in the art based on the implementations of the present application without creative efforts shall fall within the protection scope of the present application.

The following describes in detail the technical solutions provided in the implementations of the present application with reference to the accompanying drawings.

Implementation 1

As previously described, recommendation information delivered through the online interaction platform usually can include advertisements, weather information, traffic conditions, etc. In practice, when the recommendation information is delivered to the user, in order to increase the effectiveness of the delivered recommendation information, it is generally needed to deliver different pieces of recommendation information to users with different behavior preferences based on the user's behavior preferences. For example, a user named Alice likes to buy small accessories, and a user named Tom likes to buy sports goods. When advertisements are being delivered to Alice and Tom, advertisements for small accessories can be delivered to Alice and advertisements for sports goods can be delivered to Tom. However, how to determine user behavior preferences is a technical problem for companies or individuals that need to deliver recommendation information. For example, in the previous described example, how to determine that Alice likes to buy small accessories is a technical problem for companies.

In the existing technology, data reflecting user behavior preferences is usually collected through questionnaires, and the collected data is analyzed to determine the user's behavior preferences. In this way, in the process of data collection, it is necessary to first provide a questionnaire to the user. The user answers the questions in the questionnaire, and the user behavior preference is determined based on the user's answers to the questions. However, the problem of collecting data through questionnaires is that the method relies on the user's answers to the questions in the questionnaire, and when the user's answer is inaccurate, the collected data is also inaccurate, thereby affecting the accuracy of the determined user behavior preferences. For example, in practice, there is usually a phenomenon that the user's willingness to answer questions in the questionnaire is not high. At this time, the user probably answers the questions in the questionnaire very casually, resulting in deviations in the answers and affecting accuracy of the determined user behavior preferences. In addition, when the user's willingness to conduct a questionnaire survey is not high, collecting data through questionnaires usually affects the user experience and adversely affects the company.

To alleviate the problem in the existing technologies, Implementation 1 of the present application provides a method for determining a user behavior preference. Referring to FIG. 1, specific steps of the method are as follows:

Step 11: Classify recommendation information.

The recommendation information here can include advertisements, weather information, traffic conditions, etc. Generally, different types of recommendation information are delivered on different online interaction platforms. For example, for an online interaction platform of electronic payment, the recommendation information usually delivered includes advertisements; for an online interaction platform of urban transportation, the recommended information usually delivered includes city's traffic condition information; for other types of online interaction platforms, recommendation information of a corresponding type is delivered.

Before recommendation information is delivered, the recommendation information needs to be classified. In practice, the recommendation information can be classified based on different classification criteria. For example, the recommendation information can be classified into video recommendation information, image recommendation information, text recommendation information, etc., based on the presentation form of the recommendation information. The recommendation information can also be classified into recommendation information for students, recommendation information for office workers, etc., based on the crowd targeted by the recommendation information. The recommendation information can also be classified into public welfare recommendation information, commercial recommendation information, etc., based on the purpose of the recommendation information. Certainly, other classification criteria can be used for classifying the recommendation information, or classification criteria can be combined when classifying the recommendation information, for example, a piece of recommendation information is public welfare recommendation information for the student.

Step 12: Associate recommendation information and information classification label, where the information classification label is used to reflect a classification category of the recommendation information.

In practice, the online interaction platform usually has a plurality of recommendation information and a plurality of different information classification labels. Before the recommendation information and the information classification label are associated, the correspondence between the recommendation information and the information classification label needs to be determined. Generally, there are many methods for determining the correspondence between the recommendation information and the information classification label, and two preferred solutions are used as examples here.

One preferred solution is to use each piece of recommendation information as current recommendation information and determine an information classification label corresponding to the current recommendation information from the information classification labels. This determining the correspondence one by one method is more suitable when the amount of recommended information is small.

The other preferred solution is to first classify the plurality of recommendation information, and determine the correspondence between the recommendation information and the information classification label in each classification category based on the correspondence between the classification category and the information classification label. The present method for determining the correspondence is more suitable when the amount of recommended information is large.

For example, a large amount of recommendation information is classified based on different groups of people targeted by the recommendation information. The classification categories include student-oriented, office worker-oriented, and elderly people-oriented recommendation information and the corresponding classification labels include student, office worker, and elderly people. An information classification label corresponding to recommendation information in each classification category (a classification category is student-oriented recommendation information, and a corresponding information classification label is student; or other analogies) can be determined based on the correspondence between the information classification labels and the classification categories (a correspondence between student and student-oriented recommendation information or other analogies).

The recommendation information and the corresponding information classification label are associated based on the determined correspondence. After the association is performed, the information classification label can be determined by using the recommendation information, and all recommendation information associated with the information classification label can be obtained by using the information classification label. In addition, in practice, there are a plurality of methods for associating the recommendation information and the information classification label, and two preferred solutions are used as examples here.

One preferred solution is to insert, in data of the recommendation information, association data that can be associated with the information classification label, so that after the recommendation information is triggered, the information classification label associated with the recommendation information can be determined based on the inserted association data. For example, association data can be inserted in data of an advertisement (excluding data on the advertisement page), and the association data is associated with an information classification label corresponding to the advertisement, so that the information classification label of the advertisement can be determined based on the association data after the advertisement is triggered by the user. In this way, the information classification label can be hidden in the advertisement data, and the user does not see the information classification label of the advertisement when watching the advertisement, thereby not affecting the user's visual experience on the advertisement.

The other preferred solution is to insert a corresponding information classification label in the page displayed for the recommendation information. In some application scenarios, the method can improve the user's participation in the recommendation information, for example, when a classification label of the recommendation information is the public welfare.

In addition, it should be noted that after the recommendation information and the corresponding information classification label are associated, in order to facilitate retrieval and application, the recommendation information and the associated information classification label can be stored in a feature label database. Table 1 shows a structure of a feature label database in practice.

TABLE 1

| Structure of a feature label database in practice | |
|---|---|
| Recommendation information | Information classification label |
| xxx | Public welfare |

In Table 1, xxx can be an identifier or a memory address of a piece of recommendation information, and public welfare is an information classification label associated with the recommendation information.

Step 13: Deliver the recommendation information associated with the information classification label to the user.

In practice, there are a plurality of methods for delivering recommendation information to a user, and two preferred solutions are used as examples here.

A preferred solution is to first deliver the recommendation information on the online interaction platform, and then deliver the triggered recommendation information to the user based on the user's trigger operation on the delivered recommendation information. When a plurality of recommendation information need to be delivered on the online interaction platform, the recommendation information can be delivered on the online interaction platform based on the order of the effective time of the recommendation information. Alternatively, different delivery priorities can be set for these recommendation information, and the recommendation information is delivered on the online interaction platform based on a corresponding delivery priority.

Another preferred solution is to deliver the recommendation information directly to the user based on a preset delivery rule. The preset delivery rule is used to specify that recommendation information of a specified category is delivered to the user at a specified time point. For example, recommendation information of public welfare is delivered to the user every night at 20:00.

Step 14: Obtain the information classification label associated with the recommendation information when learning that the user triggers the recommendation information.

In practice, there are a plurality of methods for a server of the online interaction platform to learn whether the user triggers the recommendation information. A method can be that the server of the online interaction platform monitors triggering of the recommendation information, and learns of the triggering, by the user, of the recommendation information through monitoring. Another method can be that the server of the online interaction platform learns that the user triggers the recommendation information based on a received request for obtaining the recommendation information. In other words, after the user triggers a piece of recommendation information on the online interaction platform, the user usually sends a request for obtaining the recommendation information to the server of the online interaction platform, and the server of the online interaction platform can learn that the user triggers the recommendation information based on the request.

The user can trigger the recommendation information using a plurality of methods. For example, the user can trigger the recommendation information by clicking a link of the recommendation information by using a mouse, or can trigger the recommendation information by scanning a two-dimensional code of the recommendation information.

Generally, the server of the online interaction platform delivers a plurality of recommendation information to the user. When the server of the online interaction platform learns that the user triggers one (or more) of the plurality of recommendation information, a corresponding information classification label can be obtained based on an association relationship between the recommendation information and the information classification label.

For example, the information classification label associated with the recommendation information (here, an advertisement is taken as an example) is "student". When the server learns that the user triggers the recommendation information, the information classification label "student" associated with the recommendation information is obtained.

S15: Determine a behavior preference of the user based on the obtained information classification label.

After the information classification label is obtained, the user's behavior preference can be determined by analyzing the information classification label.

Generally, the triggering of certain recommendation information by the user can reflect certain relative preference of the user for the classification category to which the recommendation information belongs. For example, user A's place of residence is city a, and user B's place of residence is city b. Behavior preferences of user A and user B (focus on city a or city b) can be determined based on information classification labels (a traffic condition of city a or a traffic condition of city b) associated with traffic condition information triggered by user A and user B respectively.

According to the method for determining a user behavior preference provided in Implementation 1, the recommendation information and the information classification label are associated, and the information classification label of the triggered recommendation information is obtained after the user triggers the recommendation information. Because the triggering of the recommendation information by the user can generally reflect the behavior preference of the user, the information classification label can be used to determine the behavior preference of the user. The method for determining a user behavior preference alleviates the problem in the existing technology, that the accuracy of the determined user behavior preference is low when the data is collected through questionnaires and the user behavior preference is determined based on the collected data. In addition, in the method provided by the implementation, data is collected by triggering the recommendation information by the user. Therefore, the method also alleviates the problem that the user experience is poor when the data is collected by using the questionnaire method.

It is worthwhile to note that the steps of the method provided in Implementation 1 can be executed by the same device, or the method may be performed by different devices. For example, step 21 and step 22 can be executed by device 1, and step 23 can be executed by device 2. For another example, step 21 can be executed by device 1, and step 22 and step 23 can be executed by device 2.

Implementation 2

Implementation 2 of the present application provides a method for determining a user behavior preference, so as to alleviate the problem in the existing technology. Specific steps of the method are as follows:

Step 21: A user triggers a piece of recommendation information in a plurality of recommendation information, so that a server obtains an information classification label associated with the recommendation information triggered by the user, where the information classification label is used to reflect a classification category of the associated recommendation information.

Step 22: Determine a behavior preference of the user based on the obtained information classification label.

After the user triggers any piece of recommendation information delivered by the server of the online interaction platform, the server can obtain the information classification label associated with the recommendation information, and determine the behavior preference of the user based on the information classification label.

In addition, it is worthwhile to note that the user can trigger the recommendation information on a certain computing device (referred to as a current computing device) in step 21. At this time, when the server obtains the information classification label associated with the recommendation information triggered by the user, the server can further obtain a device identifier of the current computing device. The device identifier is used to uniquely represent the current computing device. In practice, the current computing device can be a mobile phone, a PC, etc. The device identifier can be a unique identifier of a processor (CPU) in the current computing device, or can be a unique identifier of a storage unit.

As such, step 21 can be as follows: The user triggers recommendation information on a current computing device, so that the server obtains an information classification label associated with the recommendation information triggered by the user and a device identifier of the current computing device, and establishes a correspondence between the obtained information classification label and the device identifier after obtaining the information classification label and the device identifier.

Correspondingly, step 22 in which the server determines the behavior preference of the user based on the obtained information classification label can be as follows: The server determines the behavior preference of the user based on the information classification label corresponding to the device identifier.

In addition, in practice, the user usually triggers the recommendation information when logging in to the online interaction platform by using a login account. In other words, the user has logged in to the online interaction platform by using the login account before triggering the recommendation information. The online interaction platform is configured to deliver the recommendation information to the user. The login account is registered by the user on the online interaction platform, and is a login account currently used for login. The online interaction platform can be an e-commerce platform, an electronic payment platform, an instant messaging platform, an electronic gaming platform, etc. When the user expects to log in to the online interaction platform using the login account, the user can log in to the online interaction platform using an application APP of the platform, or can log in to the online interaction platform using a web client.

After the user logs in to the online platform using the login account, the server can obtain the login account in addition to the information classification label associated with the recommendation information triggered by the user. The login account mentioned here can be an ID, nickname, etc. of the login account, or can be an MD5 identification code generated by the server of the online interaction platform by using the ID, nickname, etc. of the login account, or can be a random code that is randomly generated to uniquely represent the login account.

As such, step 21 can further include the following step 211 and step 212.

Step 211: The user triggers any piece of recommendation information in a plurality of recommendation information after logging in to the online interaction platform by using the login account, so that the server obtains the information classification label associated with the recommendation information triggered by the user and the login account of the user, where the online interaction platform is configured to deliver recommendation information to the user.

Step 212: Establish a correspondence between the login account and the information classification label.

Correspondingly, step 22 of determining a behavior preference of the user based on the information classification label can include step 221.

Step 221: Determine the behavior preference of the user based on the information classification label corresponding to the login account.

According to the method provided in Implementation 2 of the present application, after the user triggers any of the recommendation information, the server obtains the information classification label associated with the recommendation information triggered by the user, and determines the behavior preference of the user based on the obtained information classification label. It alleviates the problem in the existing technology that the accuracy of the collected data is low when the behavior preference of the user is collected through a questionnaire survey.

Implementation 3

As shown in Implementation 2, when the user logs in to the online interaction platform by using the login account, the server can obtain the login account in addition to the information classification label associated with the recommendation information triggered by the user, and establish the correspondence between the obtained information classification label and the login account. In practice, there are many methods for establishing the correspondence between the obtained information classification label and the login account. Implementation 3 of the present application provides a method for establishing a correspondence. Compared with Implementation 2, step 212 in Implementation 2 can be replaced with steps 3121 to 3123 in Implementation 3, and other steps remain the same.

Step 3121: Query a user feature database by using the login account.

The user feature database includes a field used for storing a user account and a field used for storing an information classification label.

Step 3122: Determine, based on the query result, whether a correspondence between the login account and the information classification label has been established, and if not, perform step 3213.

Step 3123: Establish the correspondence between the login account and the information classification label in the user feature database.

After obtaining the login account, the login account can be used to query the user feature database to determine whether the correspondence between the login account and the obtained information classification label has been established. If the correspondence has been established, it indicates that the user data has been stored in the user feature database and does not need to be stored again. If the query result indicates that the correspondence has not been established, the correspondence between the login account and the information classification label is established in the user feature database.

Here, the establishing the correspondence can be establishing a record in the user feature database, and the record stores only the login account and the information classification label, as shown in Table 2. Alternatively, the record in the user feature database stores the login account and a plurality of information classification labels, as shown in Table 3.

TABLE 2

User feature database in practice

| Login account | Information classification label |
|---|---|
| abc | Student |
| abc | Public welfare |
| Xy | Office worker |

TABLE 3

Another user feature database in practice

| Login account | Information classification label |
|---|---|
| abc | Student and Public welfare |
| Xy | Office worker |

In practice, the correspondence between the login account and the information classification label can be established using a proper method.

In addition, it is worthwhile to note that in practice, there are cases where the user triggers a plurality of recommendation information, and there are usually a plurality of information classification labels associated with the recommendation information. For example, the login account "abc" triggers recommendation information for student and public welfare. In this case, the login account of the user is usually associated with a plurality of different information classification labels, and the plurality of information classification labels can be sorted.

In practice, there are many ways to sort the plurality of information classification labels. For example, the classification labels can be sorted based on the frequency at which the user triggers each category label, and information classification label with higher trigger frequency can reflect higher behavior tendency of the user, and can be sorted to the front. Alternatively, registration information submitted by the user when registering the login account can be obtained by using the login account, and the information classification labels can be sorted by using the registration information. The registration information can be stored in an account registration information database.

For example, the login account is "ABC", and in the registration information filled in when the login account is registered, the gender is "male", the occupation is "teacher", and the hobby is "public welfare activity". When the information classification label corresponding to the login account is "commercial" and "public welfare", it can be determined, based on the registration information, that the information classification label "public welfare" can better reflect the behavior preference of the user. Therefore, "public welfare" can be sorted first.

Certainly, in practice, a plurality of sorting methods can be combined. For example, the information classification labels are sorted based on the registration information and the trigger frequency of each information classification label.

According to the method in Implementation 3 of the present application, the user feature database is queried based on the login account, and the correspondence between the unique identifier and the obtained information classification label are established in the user feature database based on the query result. Then the obtained data is stored in the user feature database, and the user's behavior preference can be determined by using the data stored in the user feature database.

Figure 2:
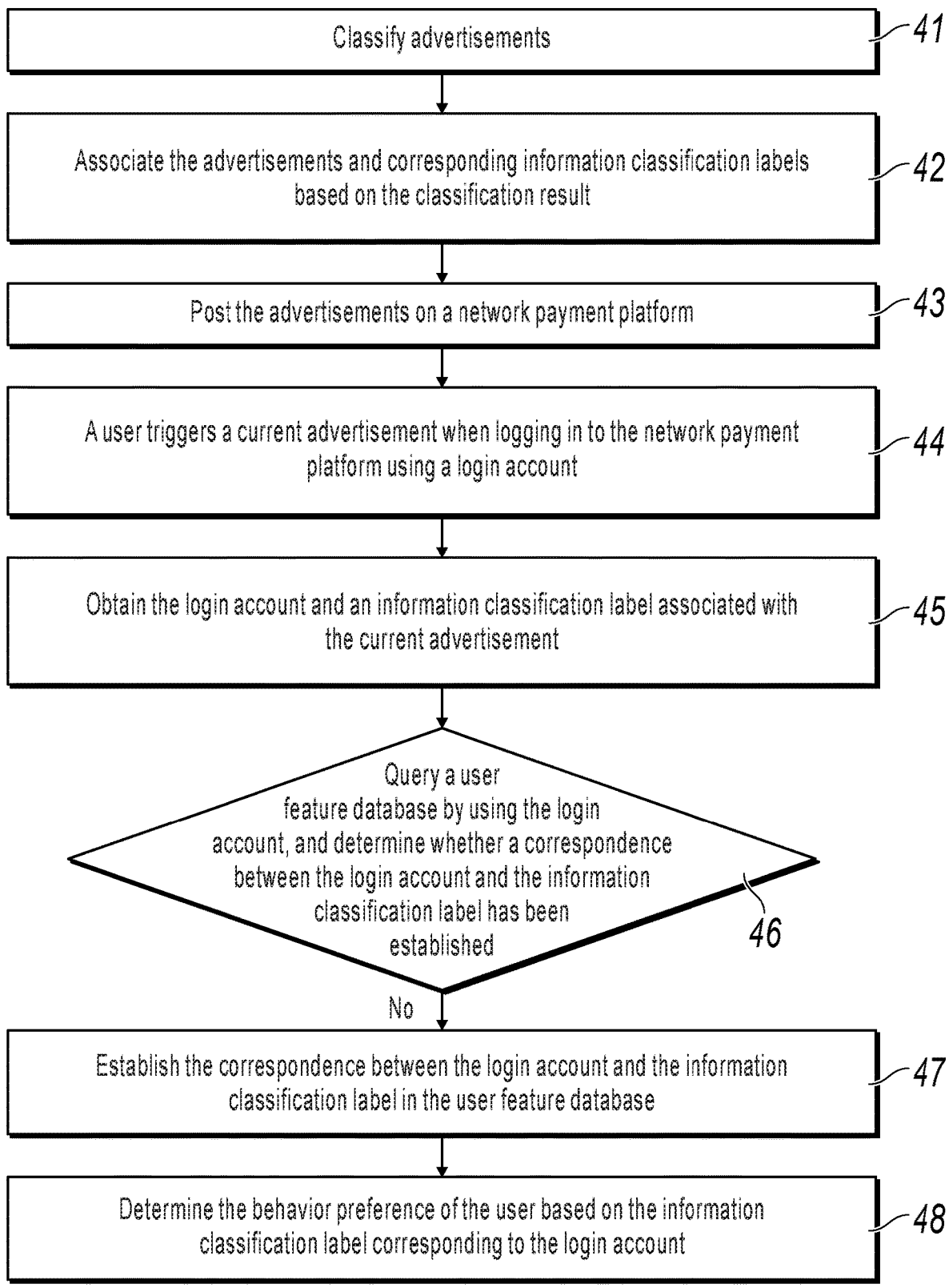
FIG. 2 is a schematic flowchart illustrating a method for determining a user behavior preference in a specific application scenario, according to Implementation 3 of the present application.
Figure 3:
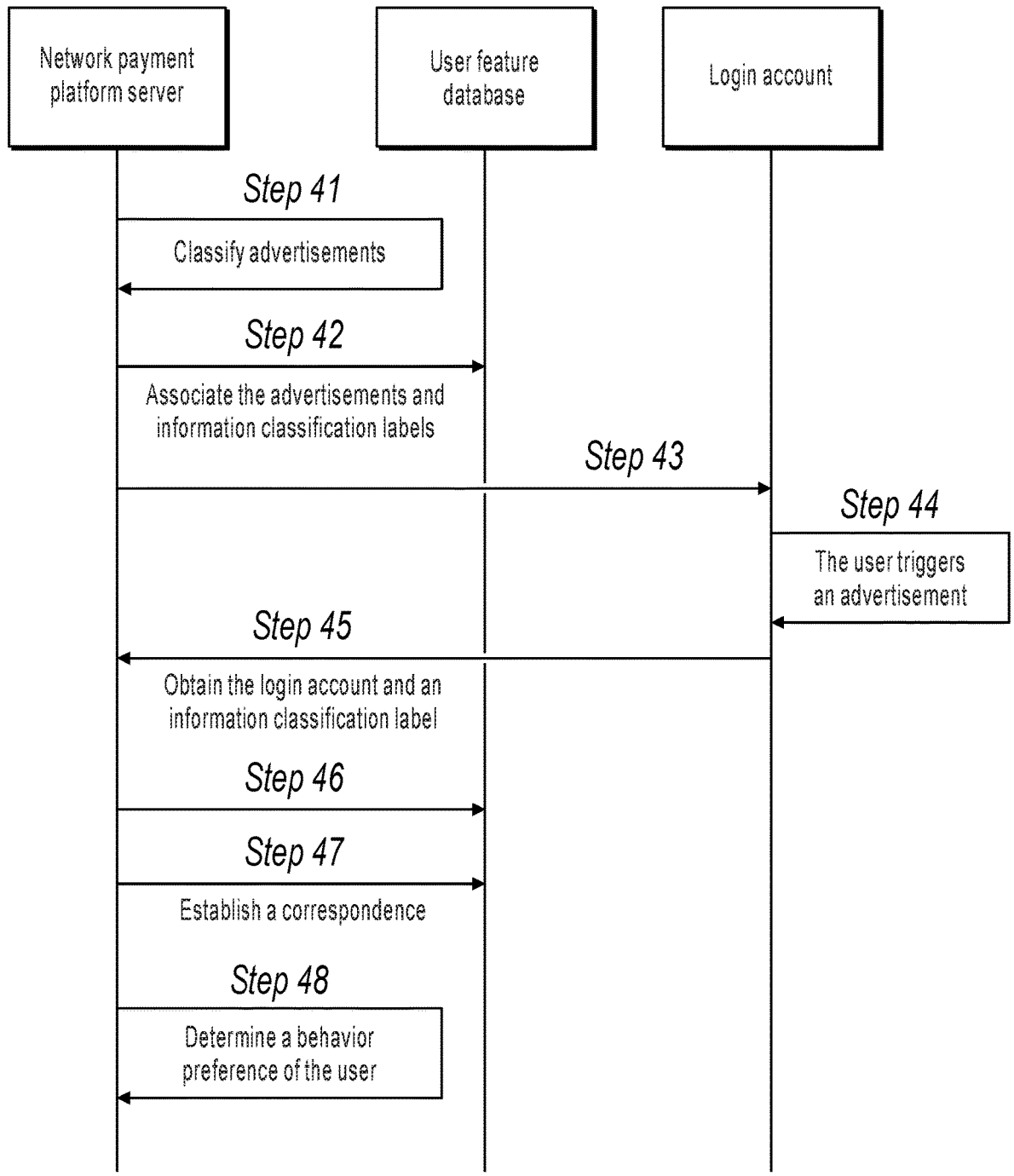
FIG. 3 is a flowchart illustrating interaction of all ends in a specific application scenario of a method for determining a user behavior preference, according to Implementation 3 of the present application.

The above is detailed description of the method for determining a user behavior preference according to the present application. In addition, for ease of understanding, an explanation of implementing the method in a specific application scenario of advertisement recommendation can also be provided here, as shown in FIG. 2 and FIG. 3. In the application scenario, the recommendation information is an advertisement, and the online interaction platform is an online payment platform, and the user logs in to the online payment platform using the login account. Specific implementation steps in the present application scenario are as follows:

Step 41: Classify advertisements.

Step 42: Associate the advertisements and corresponding information classification labels based on the classification result.

The information classification label is used to reflect a classification category of a corresponding advertisement.

Step 43: Post the advertisements on the online payment platform.

Step 44: The user triggers a current advertisement when logging in to the online payment platform using the login account.

Step 45: Obtain the login account and an information classification label associated with the current advertisement.

Step 46: Query a user feature database by using the login account, determine whether a correspondence between the login account and the information classification label has been established, and if not, perform step 47.

Step 47: Establish the correspondence between the login account and the information classification label in the user feature database.

Step 48: Determine the behavior preference of the user based on the information classification label corresponding to the login account.

Implementation 4

Figure 4:
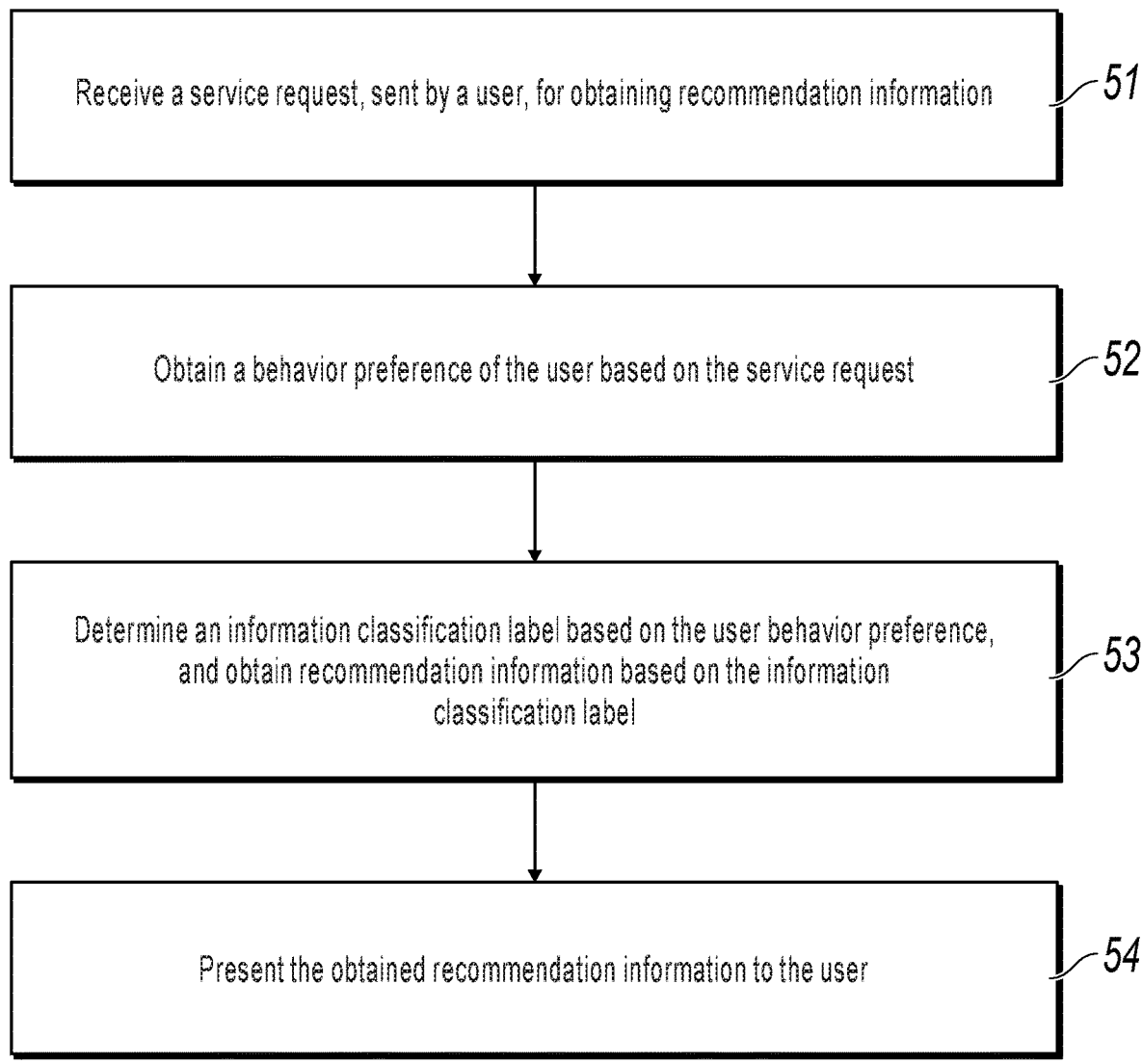
FIG. 4 is a schematic flowchart illustrating a method for presenting recommendation information, according to Implementation 4 of the present application.

Implementation 4 of the present application provides a method for presenting recommendation information. With reference to FIG. 4, specific steps of the method are as follows:

Step 51: Receive a service request, sent by a user, for obtaining recommendation information.

The recommendation information here is the same as the recommendation information in step 11. Details are not described here again.

A server receives the service request, sent by the user, for obtaining the recommendation information. For example, when the user needs to obtain an advertisement, the user can send a service request for obtaining an advertisement to the server. Correspondingly, the server can receive the service request.

Step 52: Obtain a behavior preference of the user based on the service request, where the user behavior preference is a user behavior preference determined by using the method according to any one of Implementations 1 to 3.

The user behavior preference can reflect the propensity of user behavior, which can reflect the user's preference (or disfavor) for certain categories of recommendation information. For example, a user usually views sports advertisements can reflect the user's preference for sports advertisements.

Step 53: Determine at least one information classification label based on the user behavior preference, and obtain at least one piece of recommendation information associated with the information classification label based on the information classification label.

There is an association relationship between the information classification label and the recommendation information. Recommendation information associated with the information classification label can be obtained by using the information classification label.

At least one information classification label can be determined based on the user behavior preference. Generally, the user behavior preference can reflect the tendency of the user behavior, and the behavior preference can determine which category or categories of recommendation information the user prefers, thereby determining at least one information classification label. For example, it is identified from the behavior preference of the user that the user pays attention to area a. Therefore, the weather information of the area a, the traffic condition information of the area a, the local news of the area a, etc., can be determined based on the behavior preference of the user. At least one information classification label can be determined based on these classification categories.

In addition, when there are a plurality of information classification labels, a specified quantity of information classification labels can be obtained based on the order of the classification labels. For example, when there are three information classification labels, one (or two) information classification labels of the top order can be obtained based on the order of the three information classification labels.

After the information classification label is determined, at least one piece of recommendation information can be determined based on the association relationship between the information classification label and the recommendation information.

For example, the information classification label is "student", and after the information classification label "student" is obtained, recommendation information associated with the information classification label can be obtained based on the information classification label "student".

Step 54: Present the obtained recommendation information to the user.

The obtained recommendation information is presented to the user. In practice, there can be multiple ways to display a plurality of recommendation information to a certain user, and the recommendation information can be presented to the user based on the generation time of the delivery information (for example, the last generated recommendation information is displayed first). The recommendation information can also be presented to the user in a random order.

According to the method in Implementation 4, after the service request of the user for obtaining recommendation information is received, the information classification label is determined based on the behavior preference of the user, and the associated recommendation information is determined based on the information classification label, and the recommendation information is present to the user. Because the behavior preference of the user is determined by using the methods in Implementations 1 to 3, the problem in the existing technology can be alleviated.

Figure 5:
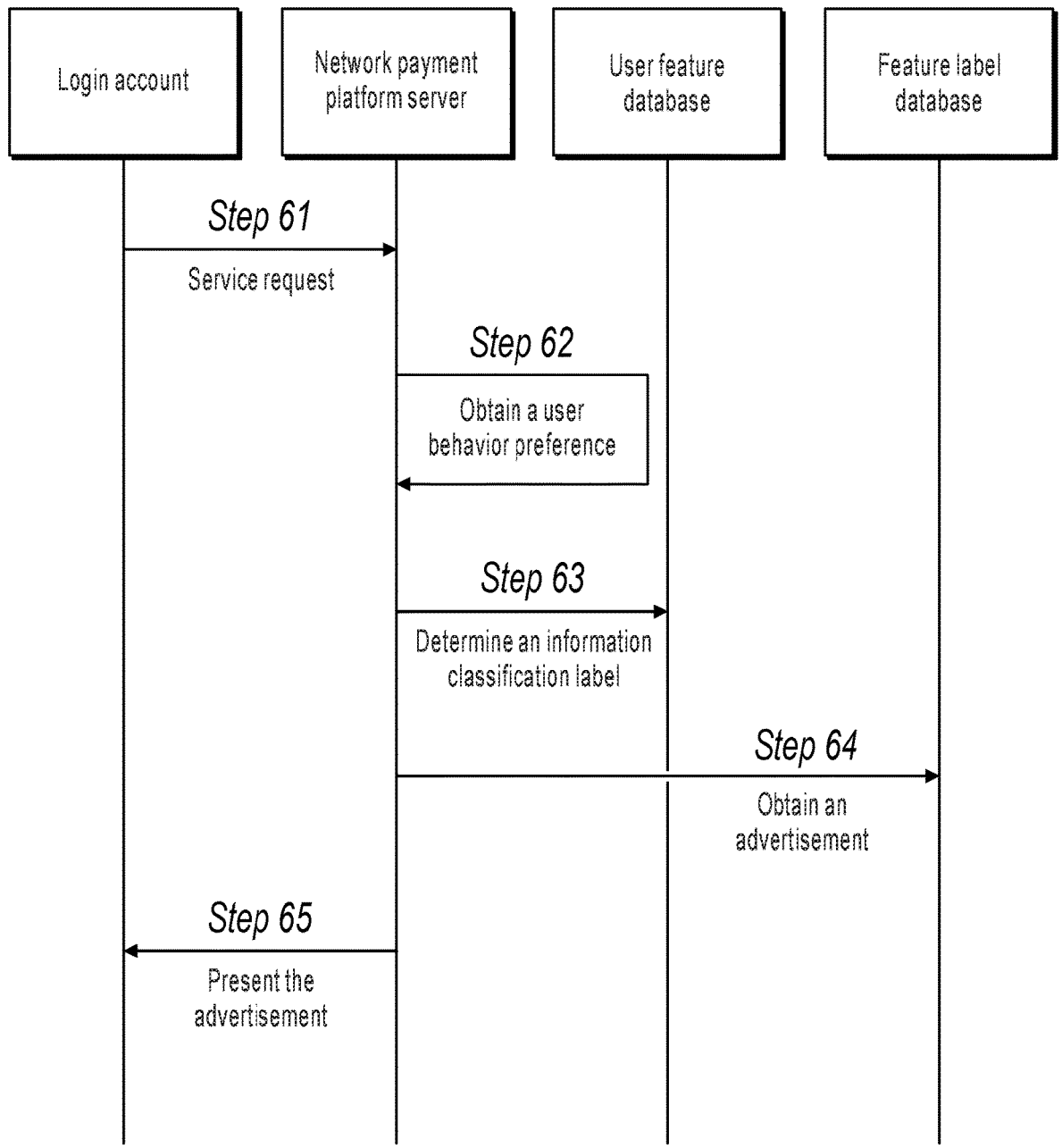
FIG. 5 is a flowchart illustrating interaction of all ends in a specific application scenario of a method for presenting recommendation information, according to Implementation 4 of the present application.

In addition, in order to facilitate understanding of the method for presenting the recommendation information, the method is applied to an application scenario of advertisement display, as shown in FIG. 5. In the application scenario, the recommendation information is an advertisement, the online interaction platform is an online payment platform, and the user logs in to the electronic payment platform using a login account.

Step 61: Receive a service request of the user for obtaining an advertisement.

Step 62: Obtain a behavior preference of the user based on the service request.

The behavior preference of the user is the user behavior preference determined according to the method in any one of Implementations 1 to 3.

Step 63: Determine at least one information classification label based on the user behavior preference.

Step 64: Obtain at least one advertisement associated with the information classification label based on the information classification label.

Step 65: Present the obtained advertisement to the user.

Implementation 5

Figure 6:
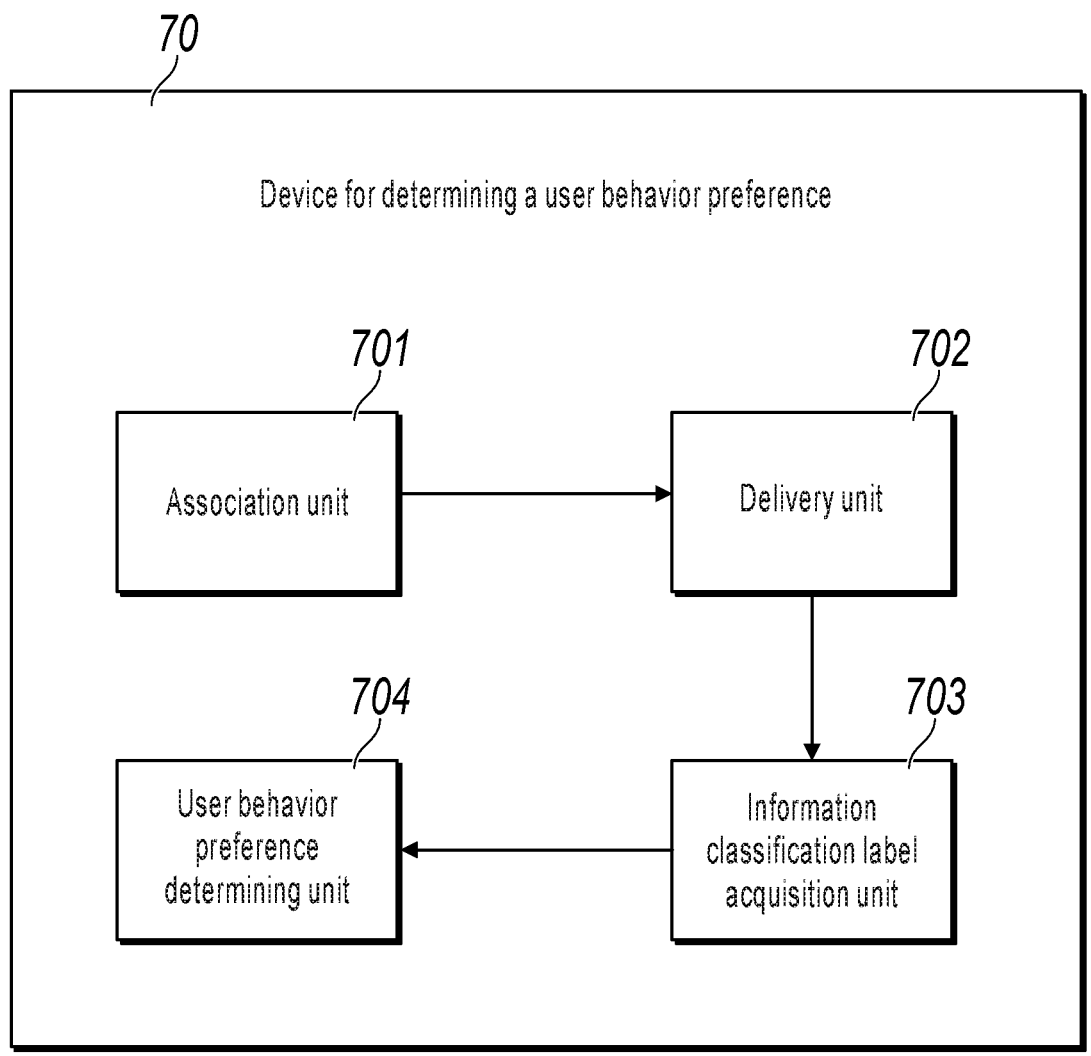
FIG. 6 is a schematic structural diagram illustrating a device for determining a user behavior preference, according to Implementation 5 of the present application.

Based on the same inventive concept as Implementation 1, Implementation 5 of the present application provides a device for determining a user behavior preference. As shown in FIG. 6, the device 70 includes an association unit 701, a delivery unit 702, an information classification label acquisition unit 703, and a user behavior preference determining unit 704.

The association unit 701 is configured to associate recommendation information and an information classification label, where the information classification label is used to reflect a classification category of the recommendation information.

The delivery unit 702 is configured to deliver the recommendation information associated with the information classification label to a user.

The information classification label acquisition unit 703 is configured to obtain the information classification label associated with the recommendation information when learning that the user triggers the recommendation information.

The user behavior preference determining unit 704 is configured to determine a behavior preference of the user based on the obtained information classification label.

Since Implementation 5 is based on the same inventive concept as Implementation 1, the implementation of the device 70 can achieve the effects achieved by Implementation 1. In addition, in practice, the device 70 can also achieve other implementation effects by combining specific hardware devices. For example, after the recommendation information is classified, the recommendation information with different classification categories is stored in different servers on the server side. When previously mentioned recommendation information are delivered, recommendation information in a specified server can be delivered at a specific time based on actual requirements. As such, the recommendation information delivery procedure can be simplified, and is not error-prone.

Implementation 6

Figure 7:
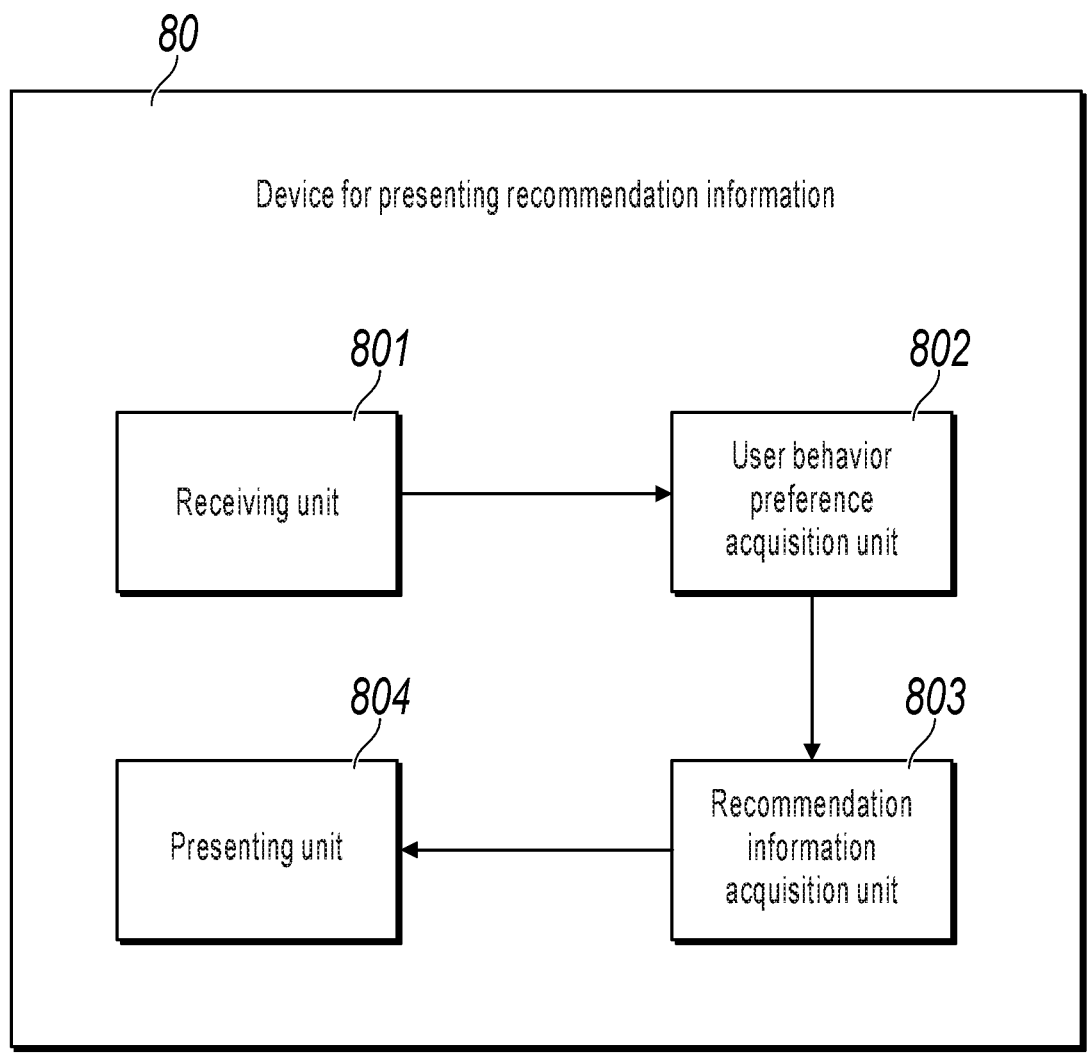
FIG. 7 is a schematic structural diagram illustrating a device for presenting recommendation information, according to Implementation 6 of the present application.

Based on the same inventive concept as Implementation 4, Implementation 6 of the present application provides a device for presenting recommendation information. As shown in FIG. 7, the device 80 includes a receiving unit 801, a user behavior preference acquisition unit 802, a recommendation information acquisition unit 803, and a presenting unit 804.

The receiving unit 801 is configured to receive a service request, sent by a user, for obtaining recommendation information.

The user behavior preference acquisition unit 802 is configured to obtain a behavior preference of the user based on the service request, where the user behavior preference is the user behavior preference determined by the device for determining a user behavior preference according to Implementation 5.

The recommendation information acquisition unit 803 is configured to determine at least one information classification label based on the user behavior preference, and obtain at least one piece of recommendation information associated with the information classification label based on the information classification label, where there is an association relationship between the information classification label and the recommendation information.

The presenting unit 804 is configured to present the obtained recommendation information to the user.

Since the device 80 in Implementation 6 of the present application is based on the same inventive concept as Implementation 4, the device 80 can achieve the implementation effects achieved by Implementation 4. In addition, in practice, new implementation effects achieved by the device 80 by combining specific hardware devices also fall within the protection scope of the present application.

Persons skilled in the art should understand that the implementations of the present application can be provided as a method, a system, or a computer program product. Therefore, the present application can use a form of hardware only implementations, software only implementations, or implementations with a combination of software and hardware. Moreover, the present application can use a form of a computer program product that is implemented on one or more computer-usable storage media (including but not limited to a disk memory, a CD-ROM, an optical memory, and the like) that include computer-usable program code.

The present application is described with reference to the flowcharts and/or block diagrams of the method, the device (system), and the computer program product, according to the implementations of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

In a typical configuration, a computer device includes one or more processors (CPU), an input/output interface, an online interface, and a memory.

The memory may include forms such as a non-persistent storage in a computer readable medium, a random access memory (RAM) and/or a non-volatile memory, such as a read-only memory (ROM) or a flash memory (flash RAM). The memory is an example of the computer readable medium.

The computer readable medium includes a persistent and a non-persistent, a removable and a non-removable medium, which implement information storage by using any method or technology. Information may be a computer readable instruction, a data structure, a module of a program or other data. Examples of a storage medium of a computer include, but are not limited to a parallel random-access machine (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc-read only memory (CD-ROM), a digital versatile disc (DVD) or another optical storage device, a cassette tape, disk and tape memory or another magnetic storage device, or any other non-transmission media, which may be configured to store information that can be accessed by a computer device. According to limitations of this specification, the computer readable medium does not include a transitory computer-readable media (transitory media), such as a modulated data signal and a modulated carrier.

It is worthwhile to note that, the terms "include", "comprise", or their any other variant is intended to cover a non-exclusive inclusion, so that a process, a method, a product, or an apparatus that includes a list of elements not only includes those elements but also includes other elements which are not expressly listed, or further includes elements inherent to such process, method, product, or apparatus. An element preceded by "includes a . . . " does not, without more constraints, preclude the existence of additional identical elements in the process, method, product, or apparatus that includes the element.

A person skilled in the art should understand that the implementations of the present application may be provided as a method, a system, or a computer program product. Therefore, the present application can use a form of hardware only implementations, software only implementations, or implementations with a combination of software and hardware. Moreover, the present application can use a form of a computer program product that is implemented on one or more computer-usable storage media (including but not limited to a disk memory, a CD-ROM, an optical memory, and the like) that include computer-usable program code.

The previous descriptions are merely implementations of the present application, and are not used to limit the present application. Various changes and modifications can be made to the present application by those skilled in the art. Any modification, equivalent replacement, or improvement made without departing from the spirit and principle of the present application shall fall within the scope of the claims of the present application.

Figure 8:
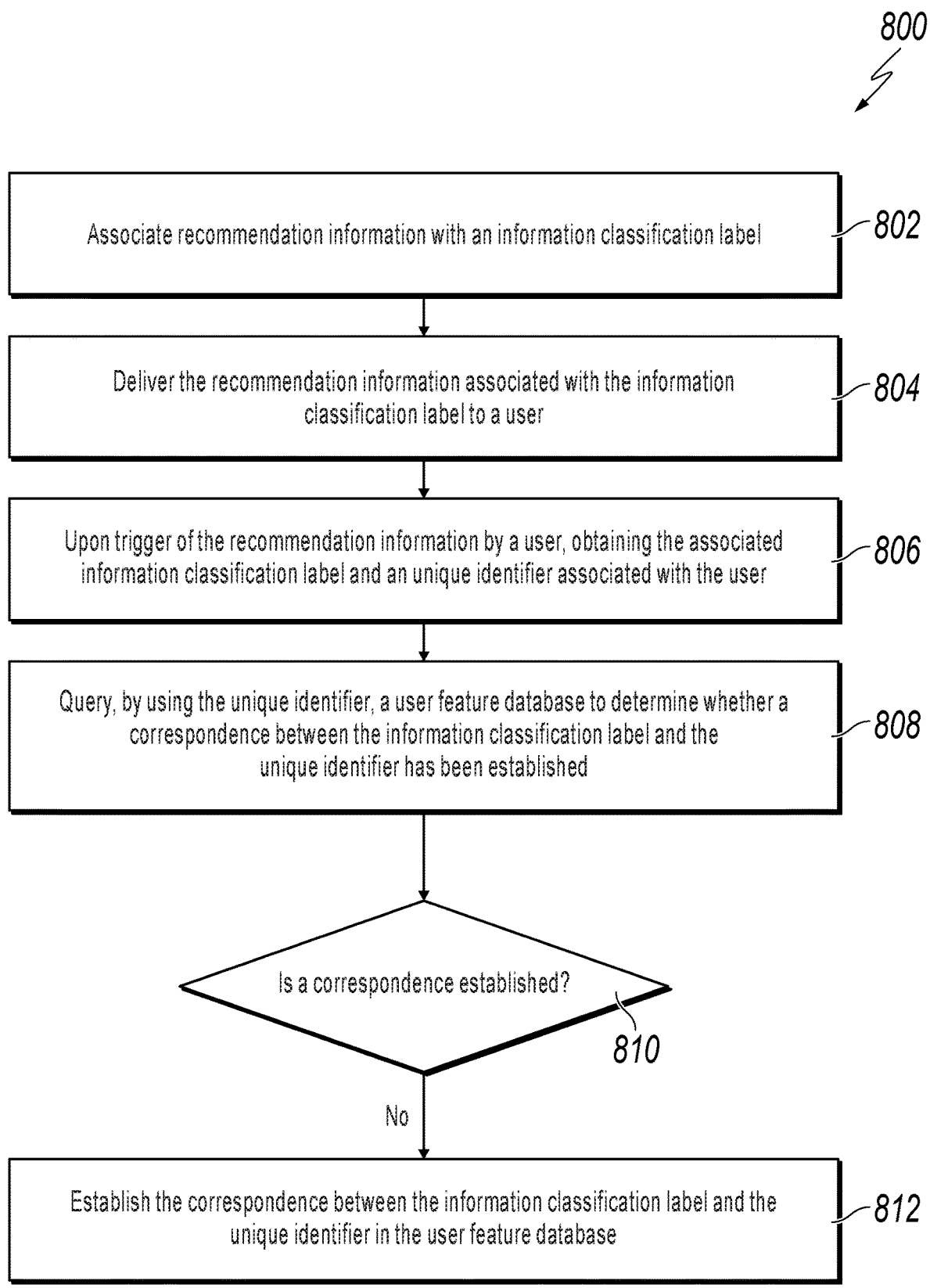
FIG. 8 is a flowchart illustrating an example of a computer-implemented method for determining a user behavior preference, according to an implementation of the present disclosure.

FIG. 8 is a flowchart illustrating an example of a computer-implemented method 800 for determining a user behavior preference, according to an implementation of the present disclosure. For clarity of presentation, the description that follows generally describes method 800 in the context of the other figures in this description. However, it will be understood that method 800 can be performed, for example, by any system, environment, software, and hardware, or a combination of systems, environments, software, and hardware, as appropriate. In some implementations, various steps of method 800 can be run in parallel, in combination, in loops, or in any order.

At 802, by a server of an online interaction platform, recommendation information is associated with an information classification label, and a correspondence between the recommendation information and the information classification label is stored in a feature label database.

In some implementations, associating the recommendation information and the information classification label includes determining a correspondence between the recommendation information and the information classification label, and the information classification label is used to reflect a classification category of the recommendation information; and associating the recommendation information and the information classification label based on the determined correspondence.

In some implementations, associating the recommendation information and the information classification label includes inserting data associated with the information classification label corresponding to the recommendation information in data associated with the recommendation information; or inserting the information classification label corresponding to the recommendation information into a page displaying the recommendation information.

In some implementations, the online interaction platform is configured to deliver the recommendation information to the user, and the user triggers the recommendation information by logging into the online interaction platform by using a login account. From 802, method 800 proceeds to 804.

At 804, the recommendation information is delivered to a user. From 804, method 800 proceeds to 806.

At 806, upon triggering of the recommendation information by a user, the information classification label associated with the recommendation information and a unique identifier associated with the user are obtained.

In some implementations, the user triggers different recommendation information that is associated with a number of information classification labels, and the number of information classification labels are sorted based on registration information used by the user to register the login account.

In such implementations, obtaining a particular information classification label of the plurality of information classification labels includes obtaining at least one information classification label based on a sorted order of the plurality of information classification labels. From 806, method 800 proceeds to 808.

At 808, by using the unique identifier, a user feature database is queried to determine whether a correspondence between the information classification label and the unique identifier has been established. From 808, method 800 proceeds to 810.

At 810, in response to determining that the correspondence is not established, the correspondence between the information classification label and the unique identifier in the user feature database is established.

In some implementations, the process further includes receiving a request for providing recommendation information to the user; querying, by using the unique identifier, the user feature database to obtain at least one information classification label corresponding to the user; retrieving recommendation information associated with the obtained information classification label from the feature label database; and presenting the retrieved recommendation information to the user. After 810, method 800 can stop.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
associating, by a server of an online interaction platform, recommendation information with an information classification label, wherein a correspondence between the recommendation information and the information classification label is stored in a feature label database;
delivering the recommendation information associated with the information classification label to a user;
upon triggering of the recommendation information by the user, obtaining the information classification label associated with the recommendation information and an unique identifier associated with the user;
querying, by using the unique identifier, a user feature database to determine whether a correspondence between the information classification label and the unique identifier has been established;
in response to determining that the correspondence between the information classification label and the unique identifier is not established, establishing and storing the correspondence between the information classification label and the unique identifier in the user feature database;
receiving a recommendation request;
identifying a set of information classification labels for which the correspondence between the information classification label and the unique identifier has been established in the user feature database;
generating a sorted order of the set of information classification labels based on a combination of registration information provided by the user and, for each information classification label in the sorted order of the set of information classification labels, a frequency with which the user has triggered recommendation information associated with the information classification label;
selecting, from the sorted order of the set of information classification labels and based on the sorted order, a group of information classification labels;
selecting recommendation information to provide to the user based on the group of information classification labels; and
providing the selected recommendation information to a user device of the user.

2. The computer-implemented method of claim 1, wherein associating the recommendation information with the information classification label comprises:
determining the correspondence between the recommendation information and the information classification label, wherein the information classification label reflects a classification category of the recommendation information; and
associating the recommendation information and the information classification label based on the determined correspondence.

3. The computer-implemented method of claim 1, wherein associating the recommendation information with the information classification label comprises:
inserting data associated with the information classification label corresponding to the recommendation information in data associated with the recommendation information; or
inserting, the information classification label corresponding to the recommendation information into a page displaying the recommendation information.

4. The computer-implemented method of claim 1, wherein the online interaction platform is configured to deliver the recommendation information to the user, and wherein the user triggers the recommendation information by logging into the online interaction platform using a login account.

5. The computer-implemented method of claim 4, wherein the user triggers different recommendation information that is associated with a plurality of information classification labels.

6. The computer-implemented method of claim 1, wherein generating the sorted order of the set of information classification labels comprises positioning a particular information classification label in the sorted order based on a match between the particular information classification label and the registration information.

7. A non-transitory, computer-readable medium storing one or more instructions executable by a computer system to perform operations comprising:
associating, by a server of an online interaction platform, recommendation information with an information classification label, wherein a correspondence between the recommendation information and the information classification label is stored in a feature label database;
delivering the recommendation information associated with the information classification label to a user;
upon triggering of the recommendation information by the user, obtaining the information classification label associated with the recommendation information and an unique identifier associated with the user;
querying, by using the unique identifier, a user feature database to determine whether a correspondence between the information classification label and the unique identifier has been established;
in response to determining that the correspondence between the information classification label and the unique identifier is not established, establishing and storing the correspondence between the information classification label and the unique identifier in the user feature database;
receiving a recommendation request;
identifying a set of information classification labels for which the correspondence between the information classification label and the unique identifier has been established in the user feature database;
generating a sorted order of the set of information classification labels based on a combination of registration information provided by the user and, for each information classification label in the sorted order of the set of information classification labels, a frequency with which the user has triggered recommendation information associated with the information classification label;
selecting, from the sorted order of the set of information classification labels and based on the sorted order, a group of information classification labels;
selecting recommendation information to provide to the user based on the group of information classification labels; and
providing the selected recommendation information to a user device of the user.

8. The non-transitory, computer-readable medium of claim 7, wherein associating the recommendation information with the information classification label comprises:
determining the correspondence between the recommendation information and the information classification label, wherein the information classification label is used to reflect a classification category of the recommendation information; and associating the recommendation information and the information classification label based on the determined correspondence.

9. The non-transitory, computer-readable medium of claim 7, wherein associating the recommendation information with the information classification label comprises:
inserting data associated with the information classification label corresponding to the recommendation information in data associated with the recommendation information; or
inserting, the information classification label corresponding to the recommendation information into a page displaying the recommendation information.

10. The non-transitory, computer-readable medium of claim 7, wherein the online interaction platform is configured to deliver the recommendation information to the user, and wherein the user triggers the recommendation information by logging into the online interaction platform using a login account.

11. The non-transitory, computer-readable medium of claim 10, wherein the user triggers different recommendation information that is associated with a plurality of information classification labels.

12. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
associating, by a server of an online interaction platform, recommendation information with an information classification label, wherein a correspondence between the recommendation information and the information classification label is stored in a feature label database;
delivering the recommendation information associated with the information classification label to a user;
upon triggering of the recommendation information by the user, obtaining the information classification label associated with the recommendation information and an unique identifier associated with the user;
querying, by using the unique identifier, a user feature database to determine whether a correspondence between the information classification label and the unique identifier has been established;
in response to determining that the correspondence between the information classification label and the unique identifier is not established, establishing and storing the correspondence between the information classification label and the unique identifier in the user feature database;
receiving a recommendation request;
identifying a set of information classification labels for which the correspondence between the information classification label and the unique identifier has been established in the user feature database;
generating a sorted order of the set of information classification labels based on a combination of registration information provided by the user and, for each information classification label in the sorted order of the set of information classification labels, a frequency with which the user has triggered recommendation information associated with the information classification label;
selecting, from the sorted order of the set of information classification labels and based on the sorted order, a group of information classification labels;
selecting recommendation information to provide to the user based on the group of information classification labels; and
providing the selected recommendation information to a user device of the user.

13. The computer-implemented system of claim 12, wherein associating the recommendation information with the information classification label comprises:
determining the correspondence between the recommendation information and the information classification label, wherein the information classification label is used to reflect a classification category of the recommendation information; and
associating the recommendation information and the information classification label based on the determined correspondence.

14. The computer-implemented system of claim 12, wherein associating the recommendation information with the information classification label comprises:
inserting data associated with the information classification label corresponding to the recommendation information in data associated with the recommendation information; or
inserting, the information classification label corresponding to the recommendation information into a page displaying the recommendation information.

15. The computer-implemented system of claim 12, wherein the online interaction platform is configured to deliver the recommendation information to the user, and wherein the user triggers the recommendation information by logging into the online interaction platform using a login account.

16. The computer-implemented system of claim 15, wherein the user triggers different recommendation information that is associated with a plurality of information classification labels.

* * * * *